United States Patent [19]

La Rosa et al.

[11] Patent Number: 5,436,589
[45] Date of Patent: Jul. 25, 1995

[54] DEMODULATOR FOR FREQUENCY SHIFT KEYED SIGNALS

[75] Inventors: Christopher P. La Rosa, Lake Zurich; Michael J. Carney, Schamburg, both of Ill.

[73] Assignee: Motorola, Inc., Schaumburg, Ill.

[21] Appl. No.: 189,376

[22] Filed: Jan. 31, 1994

[51] Int. Cl.⁶ ............................................. H03D 5/00
[52] U.S. Cl. ................................. 329/302; 329/303; 329/341
[58] Field of Search .............. 329/300, 301, 302, 303, 329/341, 342, 343; 375/80, 82, 88, 90, 94

[56] References Cited

U.S. PATENT DOCUMENTS

| | | | |
|---|---|---|---|
| 3,571,712 | 3/1971 | Hellwarth et al. | 325/320 |
| 4,190,802 | 2/1980 | Levine | 325/320 |
| 4,479,092 | 10/1984 | Falconer | 329/145 |
| 4,561,098 | 12/1985 | von Tol | 375/49 |
| 4,716,376 | 12/1987 | Daudelin | 329/107 |
| 4,922,206 | 5/1990 | Nicholas | 329/304 |
| 4,961,206 | 10/1990 | Tomlinson et al. | 375/39 |
| 5,001,724 | 3/1991 | Birgenbeier et al. | 375/10 |
| 5,049,830 | 9/1991 | Yoshida | 329/306 |
| 5,058,136 | 10/1991 | Kazecki et al. | 375/86 |
| 5,067,139 | 11/1991 | Baker et al. | 375/86 |
| 5,084,669 | 1/1992 | Dent | 324/83 D |
| 5,121,070 | 6/1992 | Tomita | 329/304 |
| 5,122,758 | 6/1992 | Tomita | 329/304 |

FOREIGN PATENT DOCUMENTS

| | | |
|---|---|---|
| 0464814A2 | 7/1991 | European Pat. Off. . |
| WO93/12578 | 6/1993 | WIPO . |
| WO93/12603 | 6/1993 | WIPO . |
| WO93/19518 | 9/1993 | WIPO . |

OTHER PUBLICATIONS

"Multilevel Decision Method for Band-limited Digital FM with Limiter—Discriminator Detection, Hirono, Masahiko Miki, Toshio and Murota, Kazuaki," IEEE Transactions on Vehicular Technology, vol. Vt-33, No. 3, Aug. 1984.

Primary Examiner—Robert J. Pascal
Assistant Examiner—David H. Vu
Attorney, Agent, or Firm—Daniel K. Nichols

[57] ABSTRACT

A demodulator (414) for improving bit error rate performance where alternating bit patterns produce the worst occurrences of bit errors. The demodulator (414) consists of a zero threshold comparator circuit (502), a first threshold detector circuit (508), and a second threshold detector circuit (504). The zero threshold comparator circuit (502) receives a frequency information signal and slices it into a plurality of bits (522). The first threshold detector circuit (508) compares the frequency information signal to a predetermined threshold, which is selected to optimize bit error rate performance. The second detector threshold circuit (504) is used to ensure that an alternating bit pattern has occurred. The demodulator (414) also includes a control device circuit (516) for coupling the plurality of bits (522) from the zero threshold comparator (502) to the output of the control device as a decision output signal (416) when the frequency information signal falls outside of either the first or second detector thresholds (508), (504). If the frequency information signal falls within both thresholds of the detector devices then the decision output signal (416) for the control device (516) is formed by inverting the bit decision from the previous bit interval.

28 Claims, 5 Drawing Sheets

DEMODULATOR FOR FREQUENCY SHIFT KEYED SIGNALS

TECHNICAL FIELD

This invention relates in general to electronic communication circuits and more particularly to demodulator circuits.

BACKGROUND

Gaussian Frequency Shift Keying (GFSK) and Gaussian Minimum Shift Keying (GMSK) have been used in a number of digital communication system applications, including Second Generation Cordless Telephone (CT-2) and Groupe Spéciale Mobile (GSM). Future applications of GMSK/GFSK include Digital European Cordless Telephone (DECT) (1.152 megabits-per-second, Mbps, data rate) and Radio Local Area Network (RLAN) (1.0 Mbps data rate).

A conventional GFSK modulator 100 as shown in FIG. 1 of the accompanying drawings shows a Gaussian Pre-Modulation Filter 104 with a time-bandwidth product BT for band limiting the nonreturn-to-zero (NRZ) data input 102. The resulting signal is then input into an FM modulator 106 having a maximum deviation set to $\Delta\theta$ Hz for providing the GFSK signal 108.

A conventional approach for demodulating GFSK information in a radio is to use an analog discriminator followed by a low-pass filter and center slicer (as a decision device). Although this demodulation method has been implemented successfully in the past, the complexity of the circuitry associated with an analog discriminator and its required tuning make it difficult to implement. Overall size and cost of the radio tends to increase with such circuitry. DC offsets inherent in analog circuitry can also make accurate frequency control difficult to achieve. Implementation of other communication functions, such as algorithms for synchronization and diversity, are difficult to implement. Furthermore, the combined band-limiting of the pre-modulation filter and the receive filters results in degraded bit error rate (BER) performance, which causes degraded receiver sensitivity in the radio.

A conventional analog demodulator for GFSK is illustrated in FIG. 2. Demodulator 200 includes an intermediate frequency (IF) filter 204 which is used to limit the noise level of the IF input signal 202, followed by a limiter/discriminator 206, a post-detection low-pass filter 208 for further noise reduction, and a center slicer 210 to slice the output into bits 212. The conventional center slicer 210 compares the frequency information signal or differential phase signal, $\Delta\theta$, to a zero threshold. When slicer circuit 210 is used nearly all bit errors occur on the two alternating bit patterns, namely, "010" and "101".

Referring to FIG. 3, a graph showing the relationship between the differential phase signal, $\Delta\theta$, and normalized symbol number for a set of bit patterns from "000" to "111" is shown. The combined band-limiting of the pre-modulation, IF, and post-detection filters results in the formation of eye patterns. The tighter the eye pattern, the worse the number of bit errors produced by the demodulator. The bit patterns "010" and "101", as shown by the eye diagrams of FIG. 3, produce the worst eye closure (i.e. eye opening=33%) and are therefore the dominant source of bit errors. The eye patterns illustrated in FIG. 3 were developed using the RLAN system parameters, where the data rate is 1.0 Mbps, the Gaussian pre-modulation filter has a BT product of 0.39, the FM modulator has its deviation set to 250 kilo-hertz (KHz), and the IF filter is a 1 mega-hertz (MHz) SAW filter. Time and phase quantization noise inherent in digital demodulators would produce even further increases in BER (e.g., tighter eye patterns) beyond those produced by analog demodulators.

An alternative data slicer structure used in demodulators is described in an article entitled, "Multilevel Decision Method for Band-Limited Digital FM with Limiter-Discriminator Detection". The article is found in IEEE Transactions on Vehicular Technology, VOL. VT-33, No. 3, August 1984. Although this method improves bit error rate performance over conventional data slicers, it requires four thresholds that need to be set accurately. It is also sensitive to time and frequency errors, variations in frequency deviation, and quantization noise.

Hence, there is a need for a demodulator that can provide a reduction in bit error rate and be easily manufactured in an integrated circuit.

DETAILED DESCRIPTION OF THE PREFERRED EMBODIMENT

Figure 1:
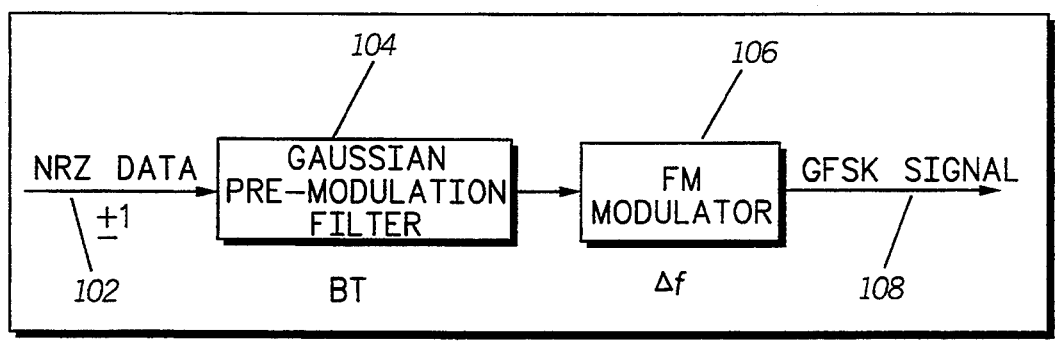
FIG. 1 shows a block diagram of a conventional GFSK modulator.
Figure 2:
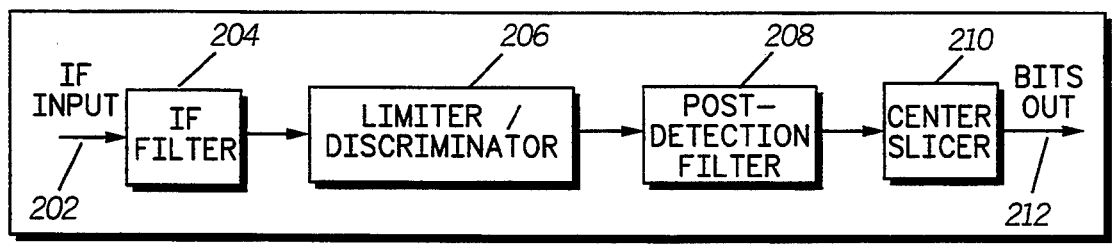
FIG. 2 shows a block diagram of a conventional GFSK demodulator.
Figure 3:
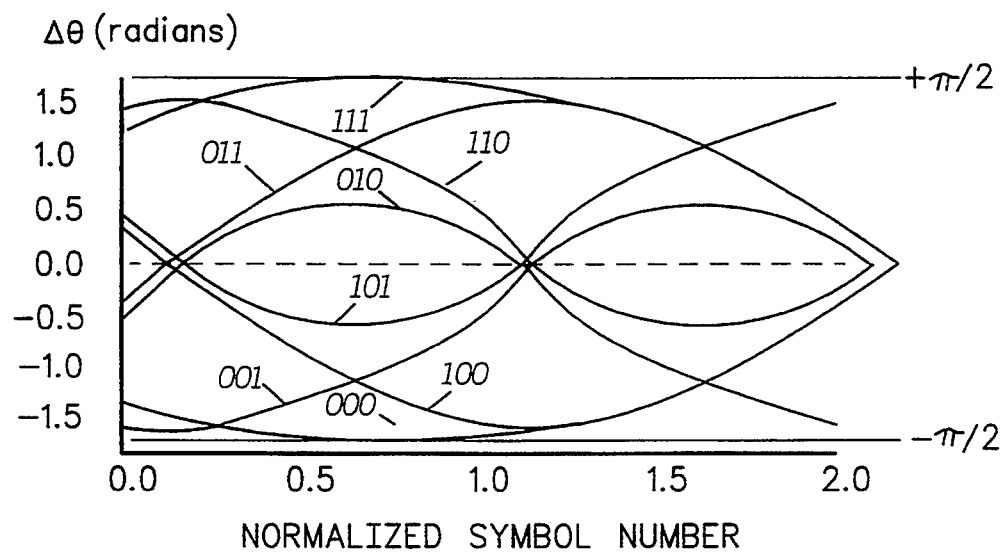
FIG. 3 shows an eye pattern produced by a conventional GFSK demodulator.
Figure 4:
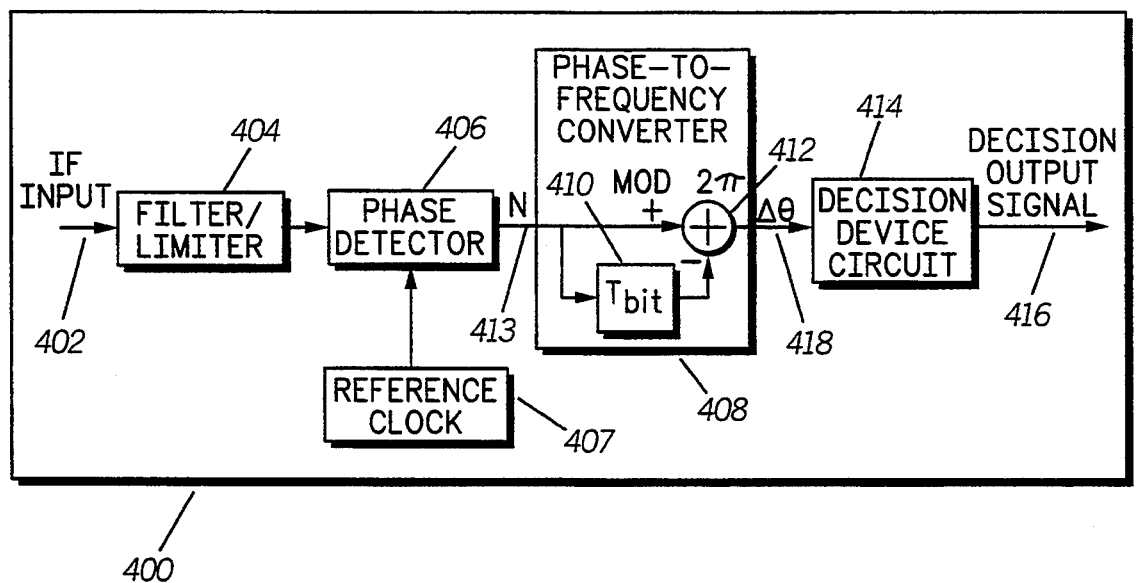
FIG. 4 shows a block diagram of a digital demodulator in accordance with the present invention.

A block diagram of a digital demodulator 400 in accordance with the present invention is illustrated in FIG. 4. A received IF signal 402, such as found in a radio receiver, is filtered and limited by a filter/limiter 404 for providing first and second state logic levels. The received IF signal 402 is modulated using frequency shift keyed (FSK) modulation, preferably Gaussian frequency shift keyed (GFSK) modulation. A phase detector 406 utilizes a high frequency clock 407 which provides a reference clock signal. The reference clock signal is used to estimate the time between zero-crossings (i.e. state transitions) of the limited IF signal. This estimate is then mapped into an N-bit word 413 representing the phase of the limited IF signal relative to the phase of the reference clock 407. A differential operation is then performed on word 413 by a phase-to-frequency conversion circuit 408 to compute the modulo-$2\pi$ phase shift over a predetermined time interval, such as a one symbol interval. The resulting frequency information signal or differential phase signal 418, $\Delta\theta$, is then sliced and mapped into bits 416 by a decision device circuit 414. Each of these major functional blocks is discussed in detail below.

The phase detector 406 internally generates an updated phase word at each zero-crossing of the IF input signal 402. The resulting phase signal is then sampled-and-held using a clock (not shown) at M times the bit rate. In the preferred embodiment, the phase detector 406 circuit generates a 7-bit phase word, 413 N=7) clocked at 8 samples per bit (M=8). In the preferred embodiment, the phase detector 406 is a direct phase digitizing circuit as described in Patent Cooperation Treaty publication number WO 93/12578, entitled "Apparatus and Method for Direct Phase Digitizing," by Christopher LaRosa, et al.

The phase-to-frequency conversion circuit 408 comprises a delay circuit 410 and a subtractor 412. The phase-to-frequency conversion circuit 408 determines the modulo-$2\pi$ phase shift of the received IF signal 402 over a symbol interval. This is done by delaying the phase word 413 by one bit period using delay circuit 410, which can be implemented with a N×M bank of D flip-flops, and subtracting the result from the current phase detector phase word 413. By using a two's complement phase mapping, a simple N-bit subtractor 412 can be used to perform the equivalent modulo-$2\pi$ differential operation.

Figure 5:
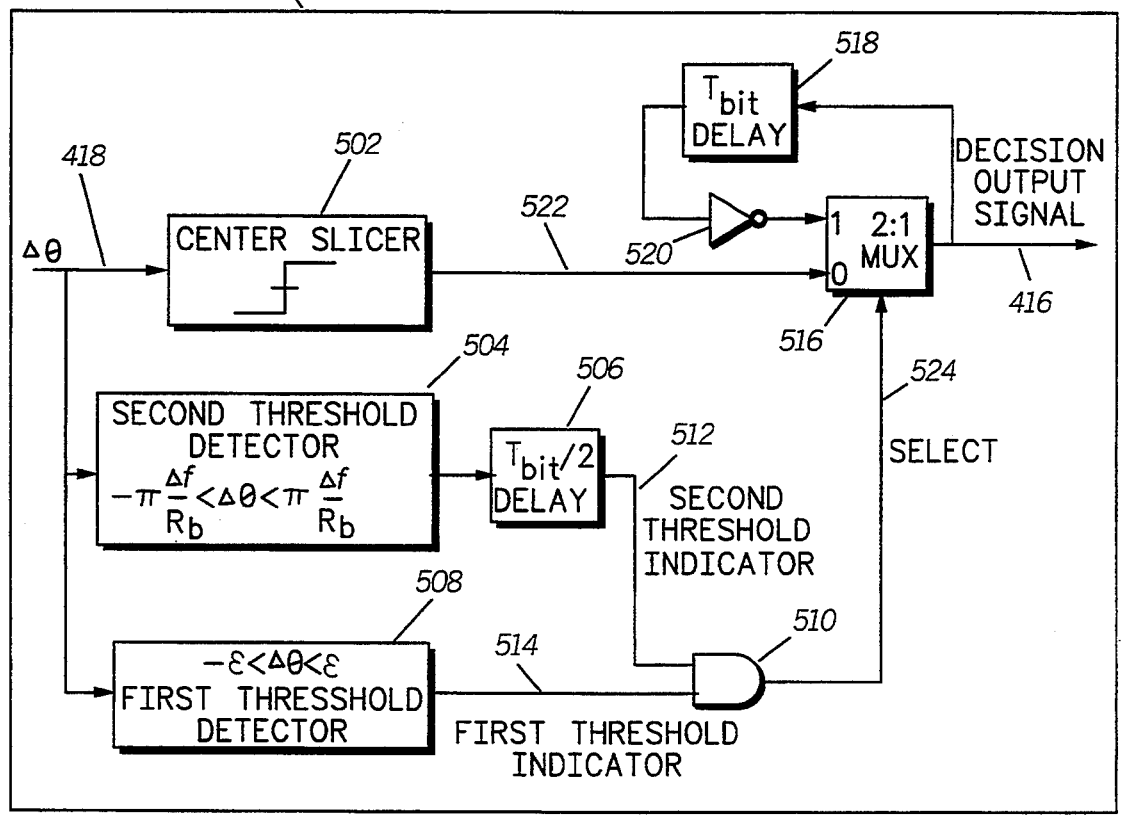
FIG. 5 shows a block diagram of the decision device circuit used in the demodulator shown in FIG. 4.

In the present invention, a decision device circuit 414, as shown in FIG. 5, is utilized to counteract the effects of band-limiting and its associated degradation in bit error rate performance. This is accomplished by providing the differential phase signal ($\Delta\theta$) 418 to a zero-threshold comparator 502, a first threshold detector 508, and a second threshold detector 504.

The zero-threshold comparator 502, takes the differential phase signal 418 and slices it into a plurality of bits 522 that are sent to an input terminal of a control device, such as a 2:1 (two inputs, one output) multiplexer, 516. A control terminal of control device 516 is responsive to a select signal 524 having a first and second logic state. When select signal 524 is a first logic state level, such as a logic level low in the preferred embodiment, the control device 516 allows for bits 522 to be passed through control device 516 and presented as decision output signal 416 at an output terminal of the control device. A delay circuit 518 delays the current decision output signal by a predetermined time interval, such as a one symbol period, and a logic gate 520 inverts the delayed output signal and presents the delayed inverted signal to a second input of control device 516. When the second state of the select signal 524 in the preferred embodiment is a logic level high, the inverted delayed output signal becomes the new decision output signal 416.

The first threshold detector 508 determines if the incoming differential phase signal 418 is unreliable by using a predetermined threshold having upper and lower limits defined by ($-\epsilon < \Delta\theta < +\epsilon$) where $\epsilon$ is programmed for optimal bit error rate performance. When the differential phase signal 418 falls outside the predetermined threshold, a first threshold indicator signal 514 is set to a first logic state level (a logic level low). When the differential phase signal 418 falls inside the predetermined threshold, the first threshold indicator signal 514 is set to a second logic state level (a logic level high). The first threshold indicator signal 514 is sent to a first input terminal of a combination means logic gate 510, such as an AND gate. In the preferred embodiment, a new logic level is presented to logic gate 510 for each 7-bit differential phase word presented to the detector circuits.

The second threshold detector 504 and delay circuit 506 are used to ensure that an alternating bit pattern produced the event. The second threshold detector 504 takes the differential phase signal 418 ($\Delta\theta$) and compares it to a threshold having upper and lower threshold limits defined by ($-\pi\Delta f/R_b < \Delta\theta < \pi\Delta f/R_b$). The threshold limits for the second threshold detector are preferably set to approximately one-half the maximum differential phase signal, or $\pm\pi(\Delta f/R_b)$, where $\Delta f$ is the maximum frequency deviation and $R_b$ is the bit rate. The second threshold detector 504 compares the differential phase signal to the second detector threshold limits and generates a first logic state level, a logic level low in the preferred embodiment, when the differential phase signal falls outside of the threshold limits. A second logic state level, a logic level high in the preferred embodiment, is produced when the differential phase signal falls within the threshold limits. The first or second logic state level is delayed by a predetermined time interval, such as one-half bit period, through a delay circuit 506 to ensure that an alternating bit pattern has produced the event. A delayed output signal such as a second threshold indicator signal 512 is sent to a second terminal of logic gate 510.

If both the first threshold indicator signal 514 and the second threshold indicator signal 512 are logic level high, the logic gate 510 will output a logic level high select signal 524 to the 2:1 multiplexer 516. This logic level high select signal 524 indicates that the decision output signal from the previous symbol period should be inverted. This delay and inversion process is accomplished by feeding back the decision output signal 416 through delay circuit 518 (e.g. a delay circuit of one bit interval) and inverting the delayed signal by using inverter 520 and providing the delayed inverted signal to the second input terminal of the 2:1 multiplexer 516. The delayed inverted signal is then passed through control device 516 to generate the decision output signal 416 when select signal 524 is a logic level high.

Figure 6:
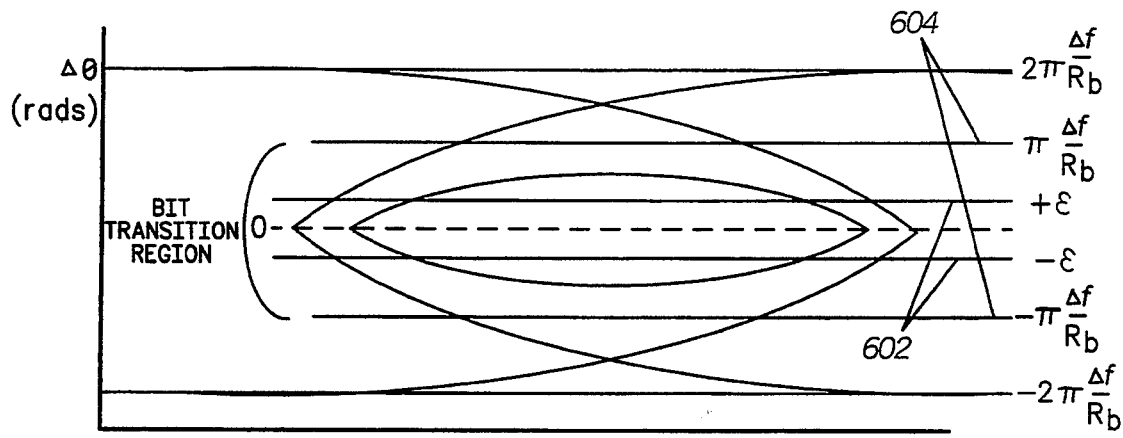
FIG. 6 shows the first and second threshold detector levels of the decision device circuit in FIG. 5.

The thresholds for the first threshold detector 508 and second threshold detector 504 are illustrated in FIG. 6. The first detector threshold, $\pm e$, 602 is selected to optimize bit error rate performance. In the preferred embodiment, the first detector threshold has been set to $\pm\pi/8$ radians, and the second detector threshold, $\pm\pi\Delta f/R_b$, 604 has been set to $\pm\pi/4$ radians.

Figure 7:
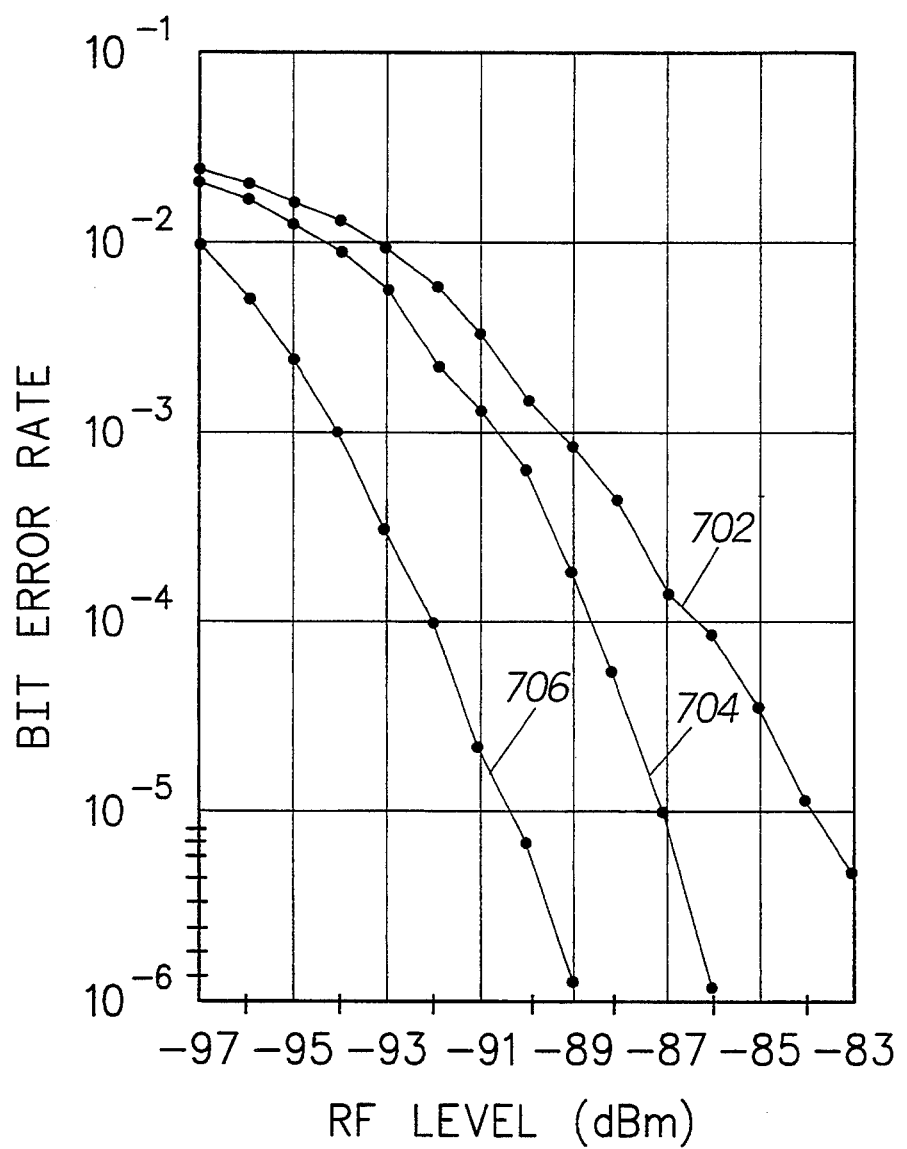
FIG. 7 shows a graph comparing bit error rate performance of the present invention vs. conventional methods for demodulating GFSK signals.

The BER performance of the RLAN demodulator has been measured and is plotted in FIG. 7. The performance of an analog discriminator having a conventional center slicer is graphed by line 704, a digital demodulator using a conventional center slicer is graphed by line 702, and the digital demodulator with decision device circuit 414 of the present invention is graphed by line 706. The measured data shows that the digital demodulator having a conventional center slicer is about 3 dB worse than the analog discriminator with a conventional center slicer at a BER of $10^{-5}$. This performance degradation is due to the time and phase quantization inherent in an all-digital approach. The demodulator of the present invention, which uses decision device circuit 414, provides for an approximately 3 dB improvement over the performance of the analog discriminator shown in graph 704 at a $10^{-5}$ BER.

Figure 8:
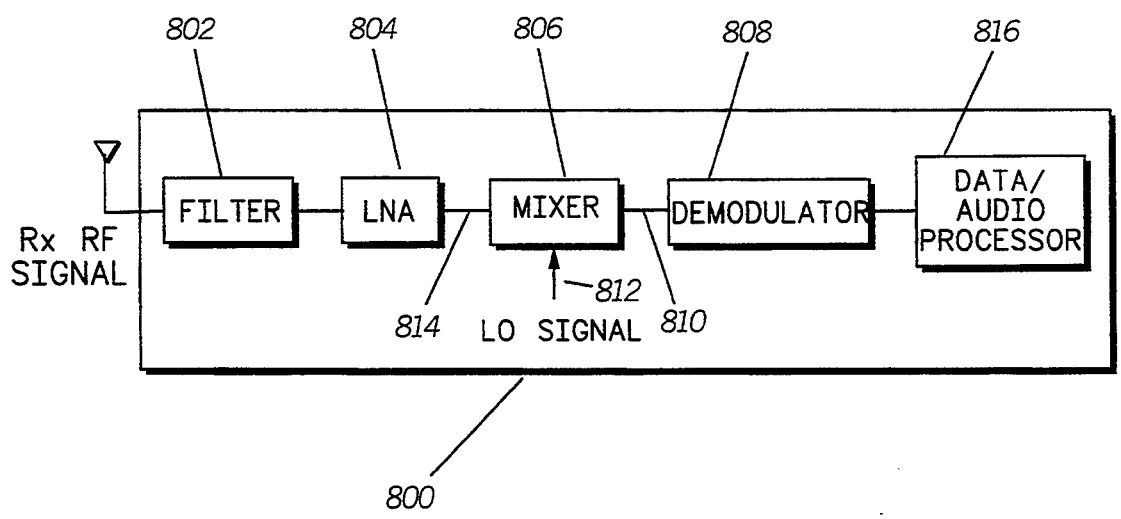
FIG. 8 shows a block diagram of a radio receiver in accordance with the present invention.

Referring now to FIG. 8, a block diagram of a radio frequency receiver 800 using the present invention is shown. A received radio frequency signal is first filtered by filter 802 and then sent to a low-noise amplifier (LNA) 804 for amplification. The amplified signal 814 is then converted to an intermediate frequency (IF) signal 810 by mixer 806. The IF signal 810 is generated by mixer 806 by combining signal 814 with a local oscillator (LO) signal 812. The IF signal 810 is then demodulated using demodulator 808 which in this case is the demodulator 400 which includes the decision device circuit 414 shown in FIG. 5. The demodulated signal is then sent to an audio/data processor circuit 816 for providing audio or data signals to the radio user.

While the preferred embodiments of the invention have been illustrated and described, it will be clear that the invention is not so limited. Although described in combination with a phase detector circuit 406 and a phase-to-frequency conversion circuit 408, the decision device circuit 414 could also be used to demodulate the frequency information signal produced by an analog discriminator and low-pass filter. Furthermore, the threshold detectors 508 and 504 could comprise of a conventional alternating pattern detector, rather than the threshold detector as described by the invention, to determine if alternating patterns occurred within the frequency information signal. Numerous modifications, changes, variations, substitutions and equivalents will occur to those skilled in the art without departing from the spirit and scope of the present invention as defined by the appended claims.

In summary, the decision device circuit 414 of the present invention has proven to be quite effective in counteracting the effects of both quantization noise and eye closure due to band-limiting. The decision device circuit of the present invention has a much simpler digital implementation, is better able to counteract quantization effects, and is much less sensitive to time and frequency errors than that which is presently available. The net result is a digital detector which offers a significant performance advantage over the conventional analog approach. The present demodulator can be readily integrated with other communication functions into a custom IC, thereby reducing the overall size and cost of the radio. In addition to the improved bit error rate performance, this invention eliminates the tuning requirements of an analog discriminator and the problems of DC offsets inherent in analog circuitry.

What is claimed is:

1. A demodulator, comprising:
   a means for converting a frequency shift keyed (FSK) signal to a frequency information signal;
   a zero threshold comparator responsive to the frequency information signal for providing a plurality of bits;
   a control device having an input terminal coupled to the zero threshold comparator for receiving the plurality of bits, and the control device having an output terminal for providing a decision output signal;
   a threshold detector coupled to the control device, the threshold detector is responsive to said frequency information signal for comparing the frequency information signal to a predetermined threshold range and providing a first logic state signal when the frequency information signal is outside of the predetermined threshold range; and
   the control device provides the plurality of bits as the decision output signal to the output terminal of the control device when the first logic state signal is provided by the threshold detector to said control device.

2. A demodulator, comprising:
   a means for converting a frequency shift keyed (FSK) signal to a frequency information signal;
   a zero threshold comparator responsive to the frequency information signal for providing a plurality of bits;
   a control device having an input terminal coupled to the zero threshold comparator for receiving the plurality of bits, and the control device having an output terminal for providing a decision output signal;
   a threshold detector coupled to the control device, the threshold detector is responsive to said frequency information signal for comparing the frequency information signal to a predetermined threshold and providing a first logic state signal when the frequency information signal is outside of the predetermined threshold;
   the control device provided the plurality of bits as the decision output signal to the output terminal of the control device when the first logic state signal is provided by the threshold detector to said control device;
   a delay circuit coupled between the input and output terminals of the control device for receiving the decision output signal and providing a delayed output signal;
   an inverter for receiving the delayed output signal and providing a delayed inverted output signal; and
   a second input terminal of the control device for receiving the delayed inverted output signal;
   the threshold detector providing a second logic state signal to the control device when the frequency information signal falls within the predetermined threshold; and
   the control device providing the delayed inverted output signal as the decision output signal to the output terminal of the control device when the second logic state signal is provided by the threshold detector to said control device.

3. A demodulator as defined in claim 2, wherein the control device comprises a multiplexer.

4. A demodulator as defined in claim 2, wherein the delay device comprises a one bit delay device.

5. A demodulator as defined in claim 2, wherein the threshold detector comprises an alternating pattern detector for determining if alternating patterns have occurred within the frequency information signal.

6. A demodulator for demodulating a frequency shift keyed (FSK) signal and providing a frequency information signal, comprising:
   a zero threshold comparator responsive to the frequency information signal for providing a plurality of bits;
   a threshold detector coupled to the control device, the threshold detector is responsive to said frequency information signal for comparing the frequency information signal to a predetermined threshold and providing a first logic state signal when the frequency information signal is outside of the predetermined threshold and a second logic state signal when the frequency information signal falls within the predetermined threshold; and
   a control means having an output terminal for providing a decision output signal, the control means providing the plurality of bits provided by the zero threshold comparator to the control means output terminal as a decision output signal in response to receiving the first logic state signal from the threshold detector, the control means delays and inverts the decision output signal and provides a delayed inverted output signal to the output terminal of the control device as a decision output signal in response to receiving a second logic state signal from the threshold detector.

7. A demodulator as defined in claim 6, wherein the control means comprises:

a control device having first and second input terminals, the first input terminal coupled to the zero threshold comparator for receiving the plurality of bits, and the control device having an output terminal for providing a decision output signal; and a feedback loop coupled between the output terminal of the control device and the second input terminal of the control device.

8. A demodulator as defined in claim 7, wherein the feedback loop comprises a delay circuit and inverter coupled in series for inverting and delaying the decision output signal present at the output terminal of the control device and presenting it to the second input terminal of the control device.

9. A demodulator as defined in claim 7, wherein the control device further comprises a control terminal for receiving the first and second logic state signals, the control device electrically couples the first input terminal of the control device to the output terminal of the control device when said first logic state signal is received at the control terminal and electrically couples the second input terminal to the output terminal when said second logic state signal is received at the control terminal.

10. A demodulator as defined in claim 9, wherein the control device comprises a multiplexer.

11. A demodulator as defined in claim 8, wherein the delay circuit comprises a one bit period delay circuit.

12. A demodulator for demodulating a frequency shift keyed (FSK) signal and providing a frequency information signal, comprising:

a zero threshold comparator responsive to the frequency information signal for providing a plurality of bits;

a control device having a first input terminal coupled to the zero threshold comparator for receiving the plurality of bits, and the control device having an output terminal for providing a decision output signal;

a first threshold detector also responsive to said frequency information signal for comparing the frequency information signal to a predetermined threshold and providing a first logic state signal when the frequency information signal is outside of the predetermined threshold and a second state logic signal when the frequency information signal falls within the predetermined threshold;

a second threshold detector also responsive to said frequency information signal for comparing the frequency information signal to a predetermined threshold and providing a first logic state signal when the frequency information signal is outside of the predetermined threshold and a second logic state signal when the frequency information signal falls within the predetermined threshold;

a first delay circuit for delaying the first or second logic state signals provided by the second threshold detector and generating a first delayed output;

a means for combining the first or second logic state signals provided by the first threshold detector with the first delayed output to provide for a select signal having a first and second logic state; and the control device responsive to the select signal, the control device providing the plurality of bits to the output terminal of the control device as the decision output signal when the select signal is at the first logic state.

13. A demodulator as defined in claim 12, further comprising:

a second delay circuit coupled between the input and output terminals of the control device for receiving the decision output signal and providing a second delayed output signal;

an inverter for receiving the second delayed output signal and providing a delayed inverted output signal; and a second input to the control device for receiving the delayed inverted output signal; and the control device electrically couples the second input terminal of the control device to the output terminal of the control device when the select signal is at the second logic state.

14. A demodulator in accordance with claim 12, wherein said first delay circuit comprises a half-bit delay circuit.

15. A demodulator in accordance with claim 12, wherein said threshold of the first threshold detector further comprises the step of setting the threshold to optimize bit error rate.

16. A demodulator in accordance with claim 12, wherein said threshold of the second threshold detector further comprises setting the threshold to one-half the maximum differential phase signal.

17. A demodulator in accordance with claim 13, wherein said second delay circuit comprises a one bit period delay circuit.

18. A method for demodulating a frequency shift keyed(FSK) signal, the method comprising the steps of:

a) converting the FSK signal into a frequency information signal;

b) converting the frequency information signal into a plurality of bits;

c) establishing a detector threshold;

d) determining whether the frequency information signal falls outside or within the detector threshold;

e) establishing a predetermined time interval;

f) forwarding the plurality of bits as a decision output signal when said frequency information signal falls outside the detector threshold; and g) inverting and delaying the decision output signal by a predetermined time interval when said frequency information signal falls within the detector threshold.

19. A method in accordance with claim 18, wherein the predetermined time interval comprises a one bit period.

20. A method for demodulating a frequency shift keyed (FSK) signal, the method comprising the steps of:

converting the FSK signal into a frequency information signal;

converting the frequency information signal into a plurality of bits;

establishing a first detector threshold;

determining whether the frequency information signal falls outside or within the first detector threshold;

establishing a second detector threshold;

determining whether the frequency information signal falls outside or within said second detector threshold;

delaying the second threshold detector output by a first predetermined time interval;

forwarding the plurality of bits as a decision output signal when either the frequency information signal falls outside the first detector threshold or the delayed output of the second threshold detector falls outside of the second detector threshold; and inverting and delaying the decision output signal by a second predetermined time interval when the frequency information signal falls within the first detector threshold and the delayed output of the second threshold detector falls within the second detector threshold.

21. A method in accordance with claim 20, wherein the first predetermined time interval for delaying the second threshold detector output comprises a one-half bit period.

22. A method in accordance with claim 20, wherein the second predetermined time interval for delaying the decision output signal comprises a one bit period.

23. A radio receiver comprising:

a frequency detector circuit for receiving a frequency Shift keyed (FSK) signal and converting it to a frequency information signal; and a decision device circuit for receiving the frequency information signal and providing a decision output signal, the decision device circuit includes:

a zero threshold comparator responsive to the frequency information signal for providing a plurality of bits;

a control device having input and output terminals, the input terminal coupled to the zero threshold comparator for receiving the plurality of bits;

a threshold detector coupled to the control device, the threshold detector is responsive to said frequency information signal for comparing the frequency information signal to a predetermined threshold and providing a first logic state signal when the frequency information signal is outside of the predetermined threshold and a second logic state signal when the frequency information signal falls within the predetermined threshold; and the control device provides the plurality of bits to the output terminal of the control device when the first logic state signal is provided by the threshold detector to said control device.

24. A radio receiver in accordance with claim 23, wherein said frequency detector further comprises:

a filter/limiter circuit for generating a filtered and limited signal related to the received FSK signal;

a phase detector circuit for receiving said filtered and limited signal and generating a phase word; and a phase-to-frequency converter for converting said phase word into said frequency information signal.

25. A frequency detector in accordance with claim 24, wherein said phase detector circuit further comprises a direct phase digitizer circuit.

26. A frequency detector in accordance with claim 24, wherein said phase-to-frequency converter circuit further comprises;

a subtractor and a delay circuit for performing a modulo-$2\pi$ phase differential operation on the received phase word;

the delay circuit is coupled to said phase word for providing a delayed phase word to a first input of the subtractor; and the subtractor having a second input coupled to said phase word and an output for providing the frequency information signal.

27. A radio receiver in accordance with claim 23, wherein said frequency detector further comprises;

an IF filter for generating a filtered signal related to the received FSK signal;

a limiter/discriminator circuit for generating a frequency information signal related to said filtered signal; and a low-pass filter for noise reduction of the frequency information signal.

28. A demodulator, comprising:

a means for converting a frequency shift keyed (FSK) signal to a frequency information signal;

a zero threshold comparator responsive to the frequency information signal for providing a plurality of bits;

a control device having an input terminal coupled to the zero threshold comparator for receiving the plurality of bits, and the control device having an output terminal for providing a decision output signal;

a threshold detector coupled to the control device, the threshold detector is responsive to said frequency information signal for comparing the frequency information signal to a predetermined threshold and providing a first logic state signal when the frequency information signal is outside of the predetermined threshold, said threshold detector comprises an alternating pattern detector for determining if alternating patterns have occurred within the frequency information signal; and the control device provides the plurality of bits as the decision output signal to the output terminal of the control device when the first logic state signal is provided by the threshold detector to said control device.

* * * * *